(12) United States Patent
Rich et al.

(10) Patent No.: US 7,752,133 B2
(45) Date of Patent: Jul. 6, 2010

(54) COMPUTERIZED SYSTEM AND METHOD FOR AN AUTOMATED PAYMENT PROCESS

(75) Inventors: J. Stephen Rich, Chattanooga, TN (US); Robin Wiley, Chattanooga, TN (US)

(73) Assignee: Unirich, LLC, Chattanooga, TN (US)

( * ) Notice: Subject to any disclaimer, the term of this patent is extended or adjusted under 35 U.S.C. 154(b) by 946 days.

(21) Appl. No.: 11/318,205

(22) Filed: Dec. 23, 2005

(65) Prior Publication Data

US 2006/0161499 A1    Jul. 20, 2006

Related U.S. Application Data

(60) Provisional application No. 60/639,354, filed on Dec. 23, 2004.

(51) Int. Cl.
*G06Q 40/00* (2006.01)
(52) U.S. Cl. .......................... 705/40; 705/44
(58) Field of Classification Search .............. 705/10–44
See application file for complete search history.

(56) References Cited

U.S. PATENT DOCUMENTS

| | | | | |
|---|---|---|---|---|
| 5,285,384 A | * | 2/1994 | Gineris | 705/31 |
| 5,899,981 A | * | 5/1999 | Taylor et al. | 705/30 |
| 6,397,196 B1 | * | 5/2002 | Kravetz et al. | 705/35 |
| 6,401,079 B1 | * | 6/2002 | Kahn et al. | 705/30 |
| 6,411,938 B1 | * | 6/2002 | Gates et al. | 705/30 |
| 6,764,013 B2 | * | 7/2004 | Ben-Aissa | 235/472.01 |
| 7,089,200 B2 | * | 8/2006 | Bode | 705/32 |

FOREIGN PATENT DOCUMENTS

WO    WO/01/59663 A1    8/2001

* cited by examiner

*Primary Examiner*—Frantzy Poinvil
(74) *Attorney, Agent, or Firm*—Baker, Donelson, Bearman, Caldwell & Berkowitz, PC; Micheline Kelly Johnson

(57) ABSTRACT

A computerized payment system and method is disclosed which provides subscribers with funds based on their income at regular, pre-defined intervals other than those on which they are normally paid. In so doing, it interfaces with the subscriber or with the subscriber and his source of income, and utilizes a computer network to electronically transfer funds and record transactions. Payments may be made with either net pay, or net pay less deductions; may be of advances or distributions; and may be of either fixed or variable amounts.

7 Claims, 24 Drawing Sheets

UNIRICH FINANCIAL SOLUTIONS

SUBSCRIBER APPLICATION ~300

Subscriber's Name [____]

FINANCIAL DATA ~330

Current Base Net Pay [____] ~350

Pay Day/Date(s) [____] ~360

370 — Pay Method ○ Hourly ○ Salaried

Frequency ○ Monthly ○ Twice-monthly ○ Every other week

~380

DEPOSIT INFORMATION

YOU MAY SELECT UP TO 3 ACCOUNTS; HOWEVER, THE DIRECT DEPOSIT YOU RECEIVE FROM YOUR EMPLOYER ON YOUR REGULAR PAYDAYS MUST BE DEPOSITED INTO ACCOUNT LISTED AS PRIMARY ACCOUNT IN ORDER FOR PAYSOURCE TO DEBIT AMOUNT OWED.

| Routing # | Institution Name | Type of Account | Account Title (as appears on your checks) | Primary | Account # | Date Modified | % Base Net Pay | Weekly Deposit |
|---|---|---|---|---|---|---|---|---|
| xxxxxxxx | Bank of America | Checking | John or Mary Doe | Primary | xxxxxxxxxx | auto-stamped | 50 | |
| xxxxxxxx | Bank of America | Savings | | | xxxxxx | auto-stamped | 25 | |
| xxxxxxxx | Teachers' Credit Union | Checking | | | xxxxxxxxxx | auto-stamped | 25 | |
| | | | | | | | TOTAL | |

[BACK] [SAVE AS DRAFT]  [CANCEL]  [CONTINUE]

FIG. 6

UNIRICH FINANCIAL SOLUTIONS

UniRich Financial Solutions

— 300

My Income (for Which I am Applying to be Paid Weekly) Comes Directly From:

○ US Military

○ Social Security

○ Full-time Employment

390

BACK

FIG. 7

UNIRICH FINANCIAL SOLUTIONS

400 — US MILITARY INFORMATION /300

Applicant's Name

Military Payroll Address
Suite #
City
State
Country        Zip

Current Base Net Pay
Pay Day/Date(s)

Contact Name
Phone ( )
Fax ( )
Email Address
Date of Separation

Military Use Only
○ Verified
○ Not Verified

THIS PAGE TO BE VERIFIED BY MILITARY PAYROLL DEPARTMENT

BACK   SAVE AS DRAFT                    SUBMIT APPLICATION

FIG. 8

UniRich Financial Solutions
PaySource

Verification Status

A discrepancy has occurred in your application/verification process. Please email, or call our Customer Service Department for assistance in completing your application/verification process.

Customer Service  1- (800) XXX-XXXX

Email _____@UniRich.com (days/hours of operations)

FIG. 10

UNIRICH FINANCIAL SOLUTIONS

UNIRICH FINANCIAL SOLUTIONS

UniRich Financial Solutions
PaySource

Verification Status

Congratulations [First/last Name] Your application has been approved

Your *first* weekly deposit will be made on ___/___/___.

Your deposits will be in the amount of $_____.00

IMPORTANT: IT IS YOUR RESPONSIBILITY (PER OUR AGREEMENT) TO INFORM UNIRICH IMMEDIATELY IF THERE ARE ANY CHANGES TO YOUR CURRENT STATUS. (This includes changes to your name/address/phone # ; employment or benefit status; base net pay amount; bank name; & account numbers.)

Customer Service   1- (800) XXX-XXXX

Email   CustomerService@UniRich.com (days/hours of operations)

[CREATE LOG-ON]

FIG. 11

UNIRICH FINANCIAL SOLUTIONS

Date

INACTIVATE  ~420

Subscriber Name
Subscriber ID — Populates by log-on
Employer Name

Inactivation Date — mm/dd/yyyy

CANCEL    SEND

FIG. 13

UniRich Financial Solutions
PaySource

~420

Are you sure you want to terminate your account?

| Yes – Terminate |
○

| No – Cancel Request |
○

UNIRICH FINANCIAL SOLUTIONS

FIG. 14

UNIRICH FINANCIAL SOLUTIONS

Date

REACTIVATE SUBSCRIBER ~430

IMPORTANT: A Reactivation fee of $15 will be deducted from first payment

- Last Name: [          ]
- Middle Name: [          ]
- First Name: [          ]
- Phone # when you were a subscriber: ( ) -
- Last Four Digits of Your Social Security #: [Only accepts 4 digits]
- Employer at time of last subscription: [          ]
- Reactivation Date: [          ]

[NEXT]  [CANCEL]

FIG. 16

UNIRICH FINANCIAL SOLUTIONS

SUBSCRIBER REACTIVATION /440 Date

Please update your personal information where appropriate

Last Name
Middle Name
First Name
Street Address — Physical Address
Apt #
City
State — Zip
Mailing Address — If Different
City
State — Zip Home Phone
Work Phone
Cell Phone Date of Birth Subscriber's Legal Agreement Cancel | I Agree - Continue

FIG. 17

UNIRICH FINANCIAL SOLUTIONS

SUBSCRIBER REACTIVATION ⟋441 Date

Please update your personal information where appropriate

Subscriber's Name [____]   Current Base Net Pay [____]

Pay Method ○ Hourly ○ Salaried

Frequency ○ Monthly ○ Twice-monthly ○ Every other week    Pay Day/Date(s)

DEPOSIT INFORMATION

YOU MAY SELECT UP TO 3 ACCOUNTS; HOWEVER, THE DIRECT DEPOSIT YOU RECEIVE FROM YOUR EMPLOYER ON YOUR REGULAR PAYDAYS MUST BE DEPOSITED INTO ACCOUNT LISTED AS PRIMARY ACCOUNT IN ORDER FOR PAYSOURCE TO DEBIT AMOUNT OWED.

| Routing # | Institution Name | Type of Account | Account Title (as appears on your checks) | Primary | Account # | Date Modified | % Base Net Pay | Weekly Deposit |
|---|---|---|---|---|---|---|---|---|
| XXXXXXXX | Bank of America | Checking | John or Mary Doe | Primary | XXXXXXXXXX | auto-stamped | 50 | |
| XXXXXXXX | Bank of America | Savings | | | XXXXXX | auto-stamped | 25 | |
| XXXXXXXX | Teachers' Credit Union | Checking | | | XXXXXXXXXX | auto-stamped | 25 | |
| | | | | | | | TOTAL | |

[BACK] [SAVE AS DRAFT]　　　　　[CANCEL] [CONTINUE]

FIG. 18

UNIRICH FINANCIAL SOLUTIONS

COMPANY APPLICATION ~500    Date: mm/dd/yyyy

Industry [→]

Title [→]

Federal Tax ID # [        ]

Company Name
As appears on file with IRS

Street Address

Email Address

Mailing Address

Suite #

PO Box #

City

City

ST [→] Zip

ST [→] Zip

First-LastName

Create User ID

Create Password

Confirm Password

Legal Agreement

321

Security Question [→]

I Do Not Agree | I Agree

FIG. 19

UNIRICH FINANCIAL SOLUTIONS

SUBSCRIBER ENROLLMENT ~510

Company ID    ALPHA-111

Employee ID    [          ]

Last Name      [ (auto population) ]
Middle Name    [          ]
First Name     [          ]

Street Address [          ]
Apt #          [          ]
City           [          ]
State          [   →   ]
ZIP            [ (auto populates) ]

Home Phone  ( )  [          ]
Work Phone  ( )  [          ]   Ext [    ]
Cell Phone  ( )  [          ]

Date of Birth   [ mm/dd/yyyy ]

Date of Hire    [ mm/dd/yyyy ] [Date Pick]

Salaried ○   Hourly ○

Frequency  [ Semi-monthly ] [Date Pick]
           [ Bi-Weekly ] [DAY]
           [ Monthly ] [Date Pick]

[ CANCEL ]        [ NEXT ]

FIG. 20

UNIRICH FINANCIAL SOLUTIONS

SUBSCRIBER FINANCIAL DATA ~520

Company ID 111

Employee ID _____    Week Ending _____   Date Pick

Name _____    Base Net Pay _____

Member Since 09/01/05    Service Charge _____ /385    Auto-calculates

| Routing # | Account Type | FINANCIAL INSTITUTION Account # | %BNP | Deposit | YTD |
|---|---|---|---|---|---|
| xxxxxxxx | Checking | xxxxxxxxxx | 50 | $250.00 | $1,000.00 |
| xxxxxxxx | Savings | xxxxxx | 25 | $125.00 | $500.00 |
| | | | | | |
| Routing # | Account Type | FINANCIAL INSTITUTION Account # | %BNP | Deposit | YTD |
| xxxxxxxx | Checking | xxxxxxxxxx | 25 | $125.00 | $500.00 |
| | | | | | |
| | | TOTAL | 100 | $500.00 | $2,000.00 |

BACK    SAVE AS DRAFT    CANCEL    SEND

FIG. 21

UNIRICH FINANCIAL SOLUTIONS

EDIT SUBSCRIBER FINANCIAL DATA — 521

Company ID  Alpha111

Employee ID

Name

| Previous Base Net Pay | | Links to service charge |
|---|---|---|
| Current Net Base Pay | | Links to service charge |
| Current Service Charge | | |

FINANCIAL INSTITUTION

| Routing # | Account Type | Account # | Modified | %BNP | Deposit | YTD |
|---|---|---|---|---|---|---|
| XXXXXXXX | Checking | XXXXXXXXX | Auto-stamped | 50 | $250.00 | $1,000.00 |
| XXXXXXXX | Savings | XXXXXX | w/ Name/Date | 25 | $125.00 | $500.00 |
| | | | auto-stamped | | | |

FINANCIAL INSTITUTION

| Routing # | Account Type | Account # | Modified | %BNP | Deposit | YTD |
|---|---|---|---|---|---|---|
| XXXXXXXX | Checking | XXXXXXXXX | Auto-stamped | 25 | $125.00 | $500.00 |
| | | | w/ Name/Date | | | |
| | | | | | | |
| | | | | TOTAL | $500.00 | $2,000.00 |

BACK  CANCEL  NEXT

FIG. 22

UNIRICH FINANCIAL SOLUTIONS

INACTIVATION / TERMINATION  ⟵ 530

Company ID    ALPHA-111

Employee ID    [        ]

Employee Name  [        ]

○ Inactivation Date

[ mm/dd/yyyy | Date Pick ]

(Choose only if employee no longer wishes to subscribe or will be on leave of absence)

○ Termination Date

[ mm/dd/yyyy | Date Pick ]

(Choose only if employee resigns or is terminated)

[ CANCEL ]     [ SEND ]

FIG. 23

UNIRICH FINANCIAL SOLUTIONS

REACTIVATION —540

A Reactivation fee of $15 will be deducted from first payment

Employee ID

Employee Name

Reactivation Date  mm/dd/yyyy  Date Pick

CANCEL   NEXT

FIG. 24

COMPUTERIZED SYSTEM AND METHOD FOR AN AUTOMATED PAYMENT PROCESS

REFERENCE TO RELATED APPLICATION

This application is based on U.S. Patent Application Ser. No. 60/639,354 filed Dec. 23, 2004.

FIELD OF INVENTION

The invention relates generally to an automated payment process, and more particularly to an automated payment process that enables an individual to be paid at predefined intervals other than those of the pay system offered by his or her company or other income source, through a computer network interface with the company or other income source and with at least one financial institution.

BACKGROUND OF THE INVENTION

In recent decades, American companies have faced vast challenges, and have found significant cost savings in changing from paying employees weekly to paying on a bi-weekly, semi-weekly, or monthly basis. This affords a company multiple benefits, including yielding greater interest income by keeping money in the financial institution longer; allowing more time to generate funds with which to make payrolls; minimizing payroll department personnel and workload requirements; and reducing the costs associated with administering payroll. Though this practice has proven to be very beneficial to companies, it has had a long-term, detrimental effect on society as a whole.

More relevant than just the mere psychological satisfaction of collecting pay at the end of each week is the reality that, in general, most people are not good managers of money. The greater majority either cannot or do not budget their income, and often find themselves stretching to make it until the next pay period. Accordingly, Americans frequently rely on resources such as high interest rate credit cards, loans, and check advance services. The result is personal debt. Debt-related stress continues to be the number one cause of divorce in America. Personal debt is a large contributor to depression and suicide. It is a major cause of health issues, insomnia, and low self-esteem.

Accordingly, it is an object of the present invention to offer an equitable solution to both company and employee. By offering to pay continuing base-net pay to employees who have already earned and are owed this money, but who would not normally receive it until their company's scheduled payday, the needs of both employees and company can be met. Using the present invention, an employee will receive his or her earned money each week as bills come due, or emergencies arise, thus providing a means for self-sufficiency through improved personal money management. Moreover, it is an additional object of the present invention to promote a steady and flowing national economy by permitting large companies and government agencies to provide their employees who are not currently paid weekly with the option to receive weekly pay, without cost to the company.

It is thus also an object of the present invention to provide a means for employees to achieve self-sufficiency, improve their credit scores, have an alternative to using costly credit cards or check advance companies, avoid expensive overdraft fees and associated charges, reduce personal debt, and reduce financial stress and the ill effects that accompany it.

Accordingly, it is seen that a need remains for a method of payment that provides for weekly pay to employees who are paid bi-weekly, semi-monthly, or monthly. It is to the provision of such that the present invention is primarily directed.

BRIEF DESCRIPTION OF THE FIGURES

FIGS. 5-24 are a series of illustrations showing the monitor screen of a work station through the different steps of subscriber enrollment, company enrollment, verification, inactivation, and reactivation.

DETAILED DESCRIPTION OF THE INVENTION

With reference next to the drawings, when the system according to the present invention is utilized, subscribers are provided with funds at regular, predefined intervals other than those on which they are normally paid. The subscriber may interact with his or her financial institution and/or with the service provider to access account information via the Internet, a computerized phone system, phone, or fax. When the subscriber is paid by the company, the service provider is reimbursed for the service of providing the intermediate pay, as well as for the amount of the intermediate pay. All funds transfers are done via direct deposit, ACH, or wire transfer. All transmissions occur over secure electronic means (such as over a VPN or the Internet via SSL).

Figure 1:
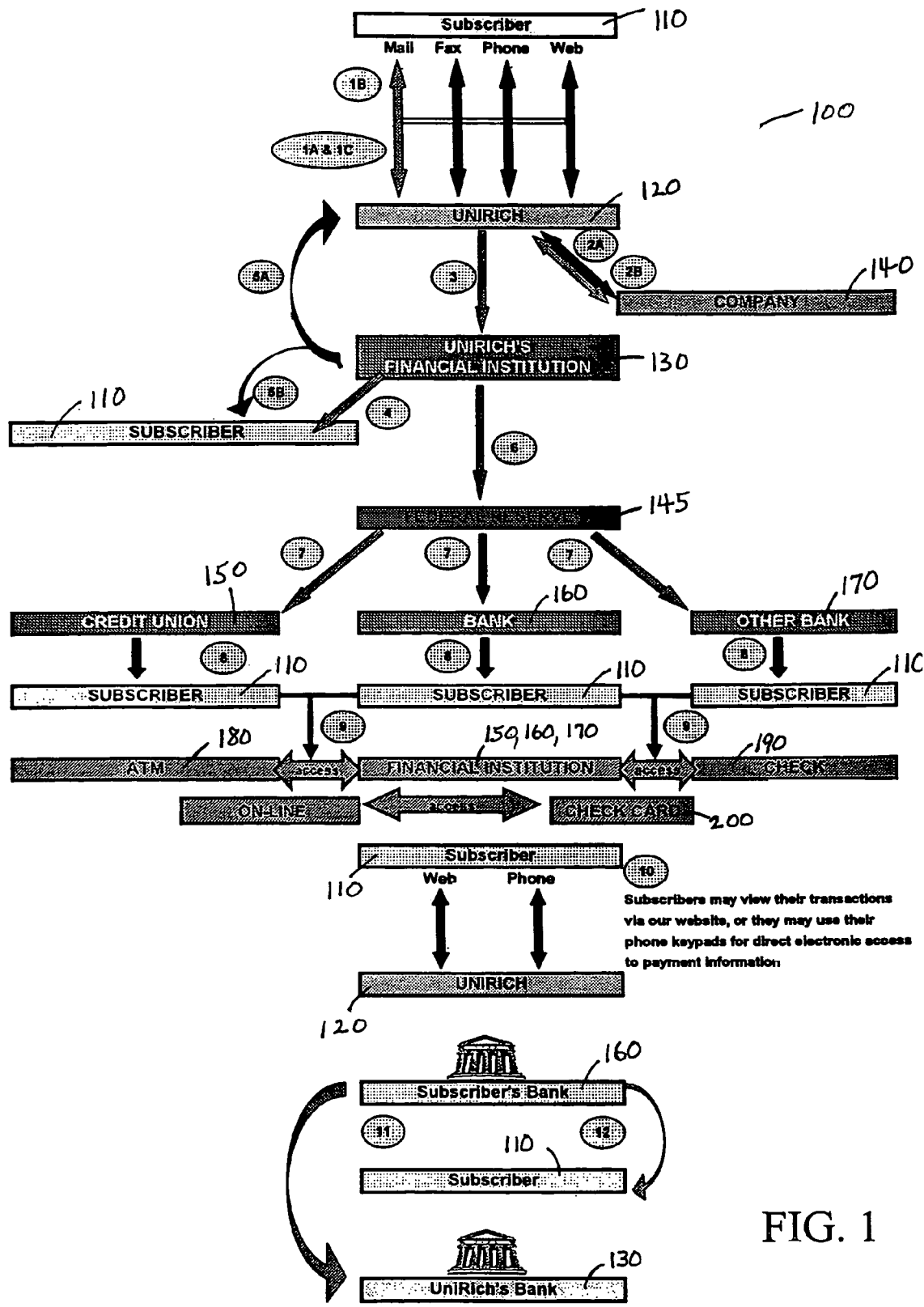
FIG. 1 illustrates an overview of a computerized system utilized according to a first preferred form of the invention.

Referring now to the numerous figures, wherein like references identify like elements of the invention, FIG. 1 illustrates an overview of a computer network 100 utilized according to a first preferred form of the invention. The first form is a subscriber-centric model that provides for payment of a contractually established fixed amount of funds. In this form, any employed individual, or one receiving Social Security benefits, retirement pay, or military pay, can self-enroll. The network 100 is accessed as shown in Steps 1A, B, and C by a subscriber 110. In Step 1A, individuals subscribe via Internet or telephone (into a computerized voice attendant). In Step 1B, the service provider 120 ("UniRich" in the drawings) sends authorization forms to a potential subscriber 110 via Internet, mail, or a facsimile. In Step 1C, subscriber 110 sends back the completed form via mail, so that original signatures are available to the service provider 120. In Step 2A, the service provider 120 scans the completed form into a computer and e-mails the form to the potential subscriber 110's company or other income source ("company 140") for verification of status and income. Alternatively, the form may be sent via mail or facsimile. In Step 2B, the potential subscriber 110's company 140 sends verification via e-mail, facsimile, or mail. The subscriber 110's credit may also be verified, and the subscriber 110 may be asked to provide the administrator 120 with a line of credit or credit card number.

In Step 3, the service provider 120 sends an electronic funds transfer authorization with direct deposit data to the service provider 120's financial institution 130. Network software will recognize any uncollected balance on each account, and stop further payment to any such account until a zero balance is indicated.

In Step 4, the service provider 120's financial institution 130 sorts by routing number, and extracts and deposits funds into the customer account for the potential subscriber 110. Thereafter, in Step 5A, the service provider 120's financial institution 130 electronically sends a transaction report to the service provider 120. In Step 5B, the service provider 120's financial institution 130 electronically sends a transaction report to any subscriber 110 who is also a customer of that financial institution.

In Step 6, the service provider 120's financial institution 130 electronically forwards the remainder of subscriber 110's deposit to the Federal Reserve 140. The Federal Reserve 140 then sorts in Step 7 the routing numbers and electronically distributes the rest of the deposit to subscriber 110's financial institution account. In Step 8, a subscriber 110's financial institution, be it credit union 150, bank 160, or other financial institution 170, sends a deposit report to its customer, subscriber 110. In Step 9, subscriber 110 may access his or her funds at his or her individual financial institution 150, 160, or 170, at the ATM 180, on line via the Internet, or by check 190, or by check card 200.

Step 10 indicates that subscriber 110 may view his transaction at the service provider 120's website, or he may use a phone keypad for direct electronic access to payment information. Step 11 indicates that the service provider 120 automatically deducts a service charge on designated dates. The subscriber 110's monthly financial institution statement reflects the transactions indicated in steps 4, 7, 9, and 11 in Step 12.

Figure 2:
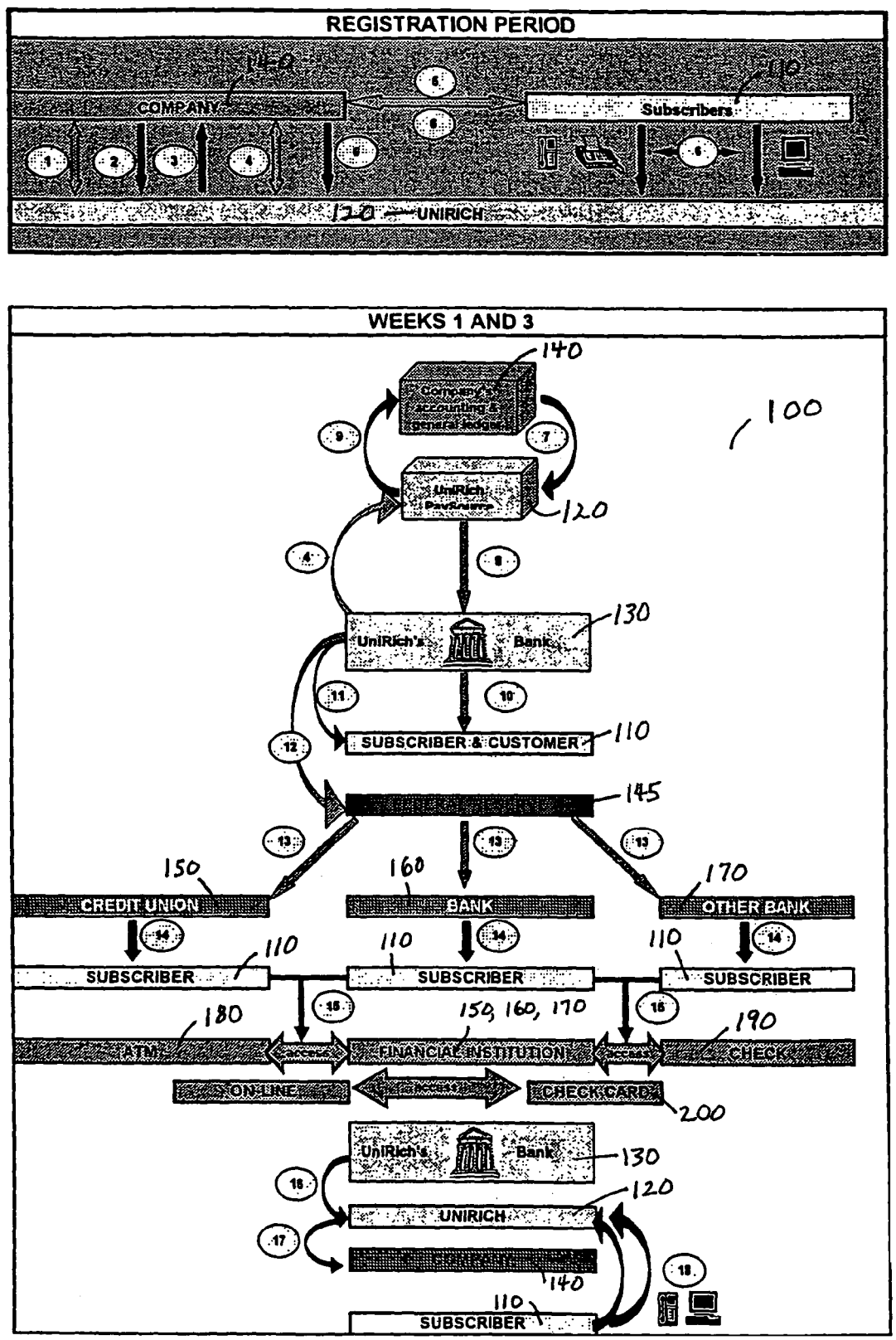
FIG. 2 illustrates an overview of a computerized system utilized according to a second preferred form of the invention during weeks one and three.
Figure 3:
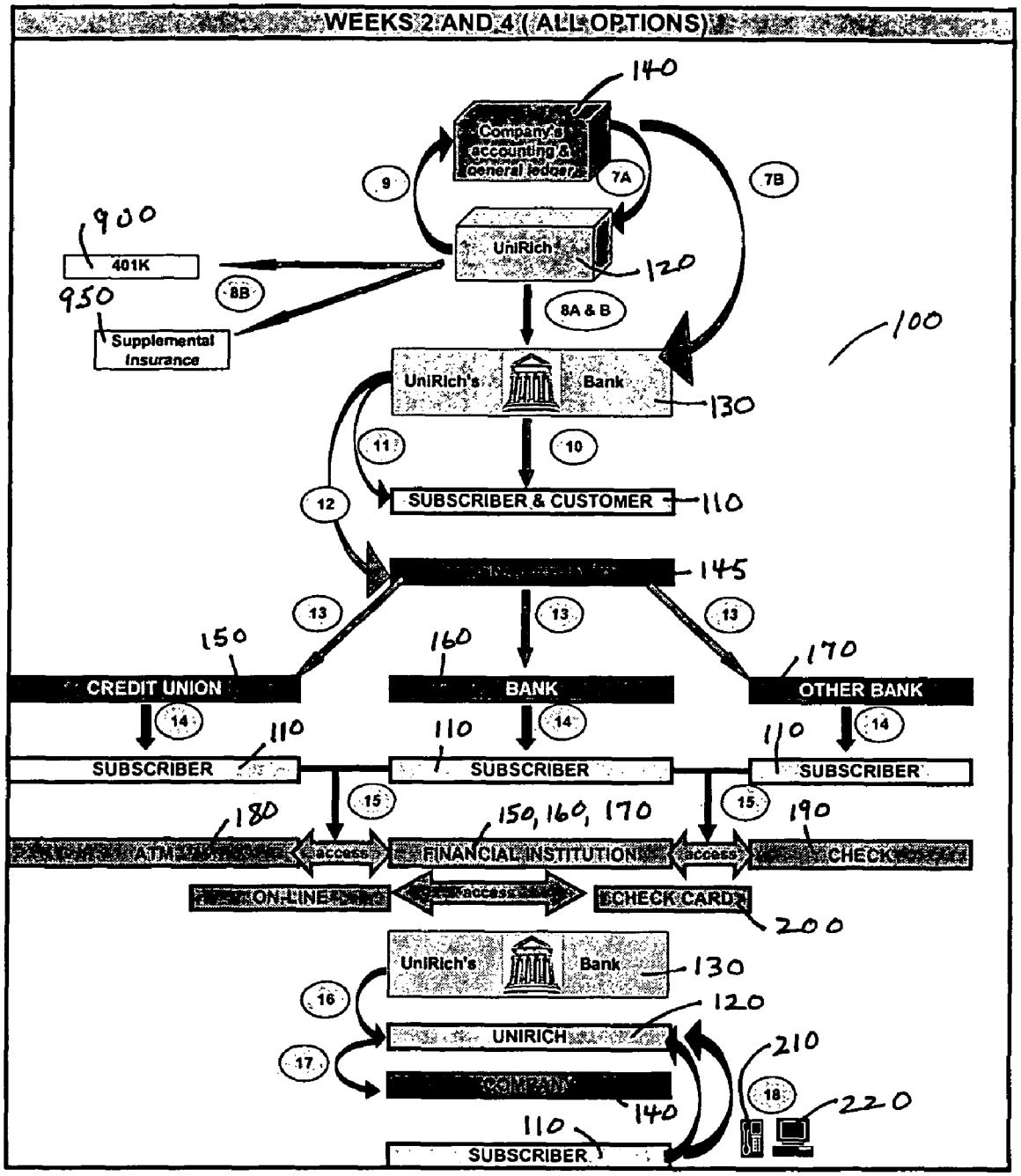
FIG. 3 illustrates an overview of a computerized system utilized according to the second preferred form of the invention during weeks two and four.

Turning to FIGS. 2 and 3, the computer network 100 utilized according to a second preferred form of the invention is illustrated. The figures show a hypothetical scenario in which a company pays every other week (designated weeks 2 and 4), and the employee wishes to be issued funds on weeks 1 and 3. In this example, weeks 2 and 4 may be considered the "pay weeks" and weeks 1 and 3 may be considered the "non-pay weeks." This model can also be used for a company which pays monthly; in that case, week 2 (or week 4, but not both) could be considered a "non-pay week." Also, in such a monthly-pay scenario, if an employee merely wanted by-weekly funds, then one week could be considered a "pay week" (i.e., the week he or she is paid by his or her employer), one week considered a "non-pay week" (i.e., the week he or she is issued funds by the service provider), and the other two weeks could be considered "inactive weeks," in which no activity occurs at all. For the remainder of this document, however, the description will assume the hypothetical scenario represented in the figures in which employees are paid biweekly by their employer, and wish to receive funds every week. According to this preferred form of the invention, which is a company-centric interface model that permits varying amounts of funds to be paid, a subscriber 110 can be initialized as follows. As shown in FIG. 2, in Step 1 the service provider 120 starts the registration period when the company 140 executes an agreement with the service provider 120. The company 140 then, in Step 2, registers on the service provider 120's website. In Step 3, the service provider 120 gives company 140 access to the computer network 100 by providing it with access credentials. In Step 4, the service provider 120 tests its systems once company 140 has completed the required registration process. Then in Step 5, company 140 informs its employees (potential subscribers 110) of the computerized system and method for providing higher-frequency pay to employees, and gets interested employees (potential subscribers 110) on direct deposit.

Employees of a subscribing company 140 sign up by applying to the appropriate department in their company. Part of this application requires instructing the company 140 to send the appropriate funds to the service provider 120, as directed by a service provider 120-produced subscriber contract. The company 140 informs the service provider 120 of any new individual subscriber 110 via the electronic means described above, and then the service provider 120, the subscriber 110, and the company 140 agree upon the amount and frequency the subscriber 110 is to be paid. To finalize his or her individual subscription, an applicant must confirm his or her information to the service provider 120 via electronic means (such as a website) or through a computerized phone system, phone or fax.

In Step 6, company 140 registers subscribers 110 via the Internet; subscribers 110 may also register themselves directly via the Internet; or subscribers 110 may phone directly into a computerized voice attendant or a call center to register themselves. This completes the registration phase.

In Step 7, employee wage information is exported from the company 140's accounting software and processed by the service provider 120's software. This may be accomplished either by on-site software, or it can be a web-based application. This application (web-based or on-site) will extract the appropriate information from the software at the appropriate time, while filtering out sensitive data such as name or Social Security number. It will then store the information in a secure relational database.

As seen in FIG. 2, in weeks 1 and 3 of this system and method under a hypothetical four-week cycle, company 140's accounting software package electronically sends wage verification data to the service provider 120 via an on-site or online interface. In Step 9, the service provider 120 sends an electronic reconciliation report back to company 140 indicating deposits made.

In Step 10, the service provider 120's financial institution 130 sorts by routing number, and extracts and deposits monies into its own customers' accounts (i.e., subscribers who are also customers of the service provider's financial institution). In Step 11, financial institution 130 electronically sends a transaction report confirming the previous step to subscribers 110 who are also its customers. Financial institution 130 electronically forwards the rest of the funds to the Federal Reserve Bank 140 in Step 12.

In Step 13, the Federal Reserve Bank 140 sorts the routing numbers and electronically distributes the rest of the deposits appropriately. In Step 14, all financial institutions 150, 160 and 170 send deposit reports to their respective customers. In Step 15, subscriber 110 may access his or her funds at his or her financial institution 150, 160, or 170, at an ATM 180, on line, or by check 190, or check card 200.

In Step 16, service provider 120's financial institution 130 electronically sends a transaction report to service provider 120. In Step 17, service provider 120 reconciles the transaction report and then forwards a copy to company 140. In Step 18, subscriber 110 may access at any time his or her records on service provider 120's website, or via phone keypads for direct electronic access to payment information. Thus, funds first go from company 140 to service provider 120, then to subscriber 110.

Referring now to FIG. 3, therein is illustrated the second preferred form of the present invention during weeks 2 and 4 of its hypothetical four-week cycle. Company 140's accounting and general ledger software package exports wage verification data which is then sent to the service provider 120 via on-site software or over the Internet (Step 7A). In Step 7B, company 140 transfers two weeks (or however many weeks since the last paycheck, including the current week, the service provider will have provided pay) of subscriber 110's base net pay to service provider 120's bank account. This repays service provider 120 for funds issued to date plus service charges, and enables service provider 120 to pay subscriber 110's current week's pay.

In Step 8, the service provider 120 electronically initiates direct deposits from its own financial institution 130 into the accounts of all individual subscribers 110 who are due to receive intermediate funds that week, just as with the first preferred embodiment. However, in this second embodiment, the amount of funds a subscriber 110 is issued is based on how much the subscriber 110 earned during that week, how much the subscribe 110 earned on average during a past period of time, or some combination or variation thereof. When the subscriber 110 is to be paid by his company 140, the amount owed to the service provider 120 (the amount of funds issued since the last paycheck as well as the service charges incurred in that time) is automatically transferred to the service provider 120 by a funds transfer of that amount from the company 140 to the service provider 120. The subscriber 110 is paid that week by a funds transfer from the company 140 to the subscriber 110, for the amount owed to subscriber 110 for that week less the transaction fee owed to the service provider 120 for that week, if applicable. Thus, funds first go from the service provider 120 to subscribe 110, then from company 140 to the service provider 120.

As an alternative form of Step 8, the second preferred embodiment may also include, or may use exclusively, the following payment method. In this case, the company 140 sends the appropriate amount of a subscriber 110's paycheck (as determined in the contract signed by the subscriber 110 during his or her application to the service provider 120) directly to the service provider 120 (via direct deposit). The company 140 withholds tax as appropriate. Also, the company 140 may make appropriate post-tax deductions, such as for a 401K plan 900 or for supplemental income 950, from the subscriber 110's paycheck, or the service provider 120 may be designated to perform this task (also determined by the contract signed by the subscriber 110 during the application process). The service provider 120 then direct-deposits the remaining amount of the paycheck into the subscriber 100's account, less the amount required for reimbursement to the service provider 120 for funds disbursed and service charges.

In Step 9, service provider 120 sends an electronic reconciliation report back to company 140 indicating that deposits were made. In Step 10, service provider 120's financial institution 130 sorts deposits by routing number, and extracts and deposits monies into its customers' accounts.

In Step 11, service provider 120's financial institution 130 electronically sends a transaction report to its customers who are also subscribers 110. In Step 12, service provider 120's financial institution 130 electronically forwards the rest of the deposit monies to the Federal Reserve Bank 140.

In Step 13 Federal Reserve Bank 140 sorts the balance of deposit monies by routing numbers and electronically distributes the rest of the deposits appropriately. In Step 14, all financial institutions 150, 160, and 170 send a deposit report to their respective customers.

In Step 15, it is illustrated that a subscriber 110 may access his funds at his financial institution 150, 160, or 170, by ATM 180, on line, or by check 190, or check card 200.

In Step 16, service provider 120's financial institution 130 electronically sends a transaction report to service provider 120 (Step 16). In Step 17, service provider 120 reconciles the transaction report and then forwards a copy to company 140. In Step 18, it is shown that subscriber 110 may access his or her records on service provider 120's website 220, or via telephone interface 210.

Figure 4:
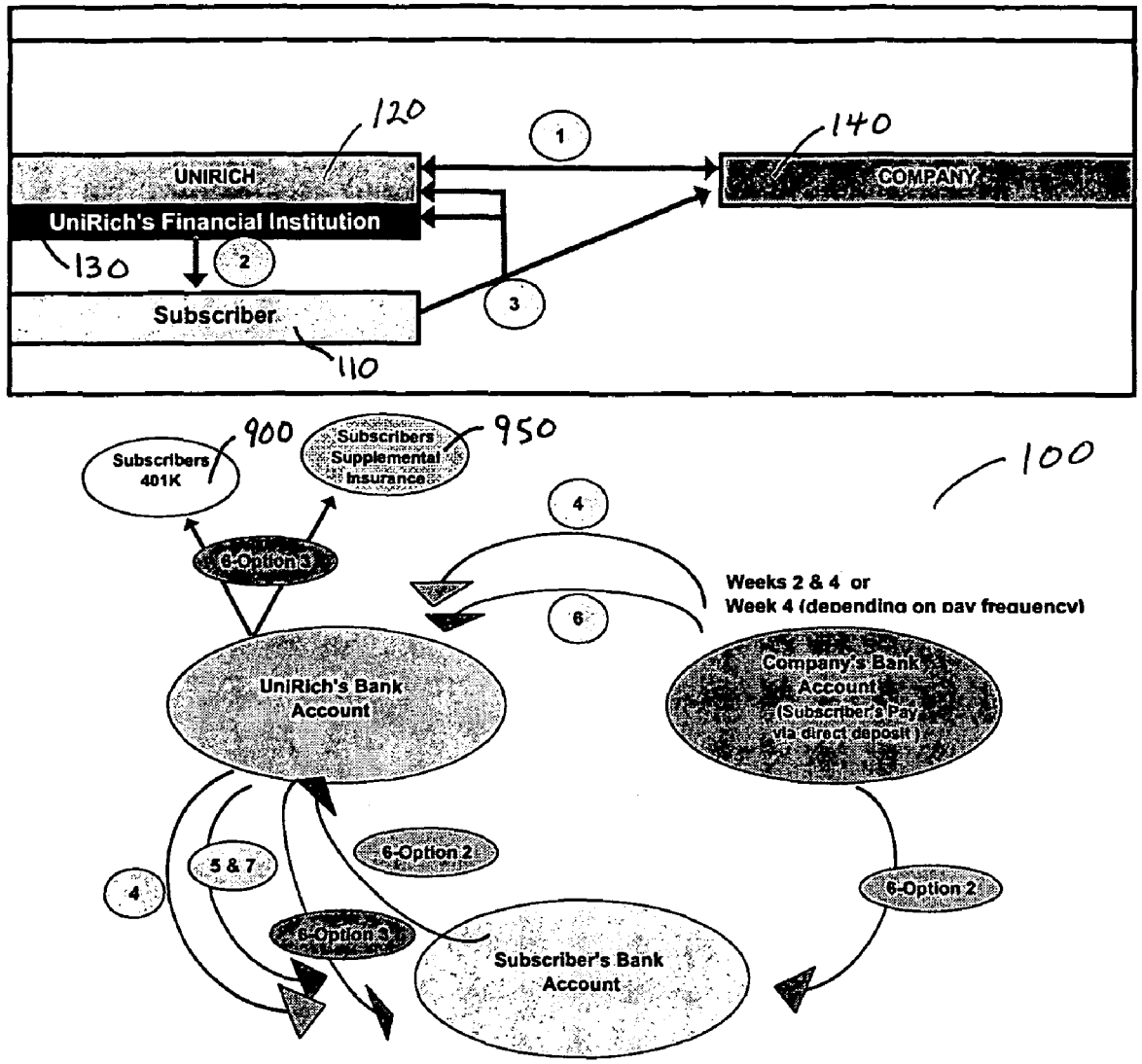
FIG. 4 illustrates an overview of a computerized system utilized according to a third preferred form of the invention.

Referring now to FIG. 4, a third preferred embodiment of the present invention is illustrated. In this third preferred embodiment, a company 140 optionally endorses the service, but individuals subscribe to the service directly. Payroll data is not published to the service provider 120. Instead, payments are based entirely on amounts established by contract when each subscriber 110 joins, and are sent directly from the company 140 to the service provider 120. The company 140 sends either (1) all of the subscriber 110's net base pay after withholding taxes, or (2) all of the subscriber 110's net pay less any post-tax deductions such as for a 401K plan 900 or for supplemental insurance 950. In addition, where the company 140 sends all of the subscriber 110's net base pay to the service provider 120, the subscriber 110 optionally may designate contractually that the service provider 120 is to pay other deductions as appropriate from these funds. The service provider 120 is reimbursed as in either of the alternative reimbursement methods utilized in the second preferred embodiment.

As seen in FIG. 4, in Step 1, the service provider 120 optionally meets with company 140 and company 140 optionally agrees to allow the service provider 120 to introduce company 140's employees to the service.

In Step 2, the service provider 120 and its financial institution 130, working together, optionally introduce the service to employees of company 140. In Step 3, each employee becoming a subscriber 110 will execute two direct deposit forms and one agreement form provided by the service provider 120 and its financial institution 130. The incoming direct deposit form will facilitate a weekly payment from the service provider 120's financial institution 130 account to the subscriber 110's account at the financial institution of his or her choice. The outgoing direct deposit form will authorize a subscriber 110's company 140 to directly deposit the subscriber 110's paycheck into the service provider 120's account.

In Step 4, direct deposit PreNotes are sent to test accuracy. Then, in Step 5, the service provider 120 deposits designated base net pay into subscriber 110's account. In Step 6, on scheduled paydays, company 140 pays its employees (subscribers 110) via direct deposit into the service provider 120's account. Then, in Step 7, the service provider 120 deducts the amount it is owed for any service charges and previous payments to subscriber 110, and direct deposits the balance into subscriber 110's bank account.

Alternatively, the payment process may proceed as follows. In Step 3, each subscriber 110 will execute two direct deposit forms and one agreement form provided by the service provider 120 and its financial institution 130. The incoming direct deposit form will facilitate a weekly payment from the service provider 120's financial institution account to the subscriber 110's financial institution account at the financial institution of his or her choice, just as in the first option. In Option 1, the company 140 sends the appropriate amount of a subscriber 110's paycheck (as determined in the contract signed by the subscriber 110 during his or her application to the service provider 120) directly to the service provider 120 (via direct deposit). The company 140 withholds tax as appropriate. Also, the company 140 may make appropriate post-tax deductions, such as for a 401K plan 900 or for supplemental insurance 950 (outlined as Option 3), from the subscriber 110's paycheck, or the service provider 120 may be designated to perform this task (also determined by the contract signed by the subscriber 110 during the application process). The service provider 120 then direct-deposits the remaining amount of the paycheck into the subscriber 110's account, less the amount required for reimbursement to the service provider 120 for funds disbursed and service charges. In Option 2, on scheduled paydays, company 140 pays its subscriber 110 via direct deposit to the subscriber 110's own financial institution account. An electronic transfer or ACH automatically debits the individual subscriber 110's financial institution account and sends repayment funds in the amount of previous payments to the individual subscriber 110, plus service charges, back to the service provider 120's account, leaving the remainder in the individual subscriber 110's bank account.

Figure 5:
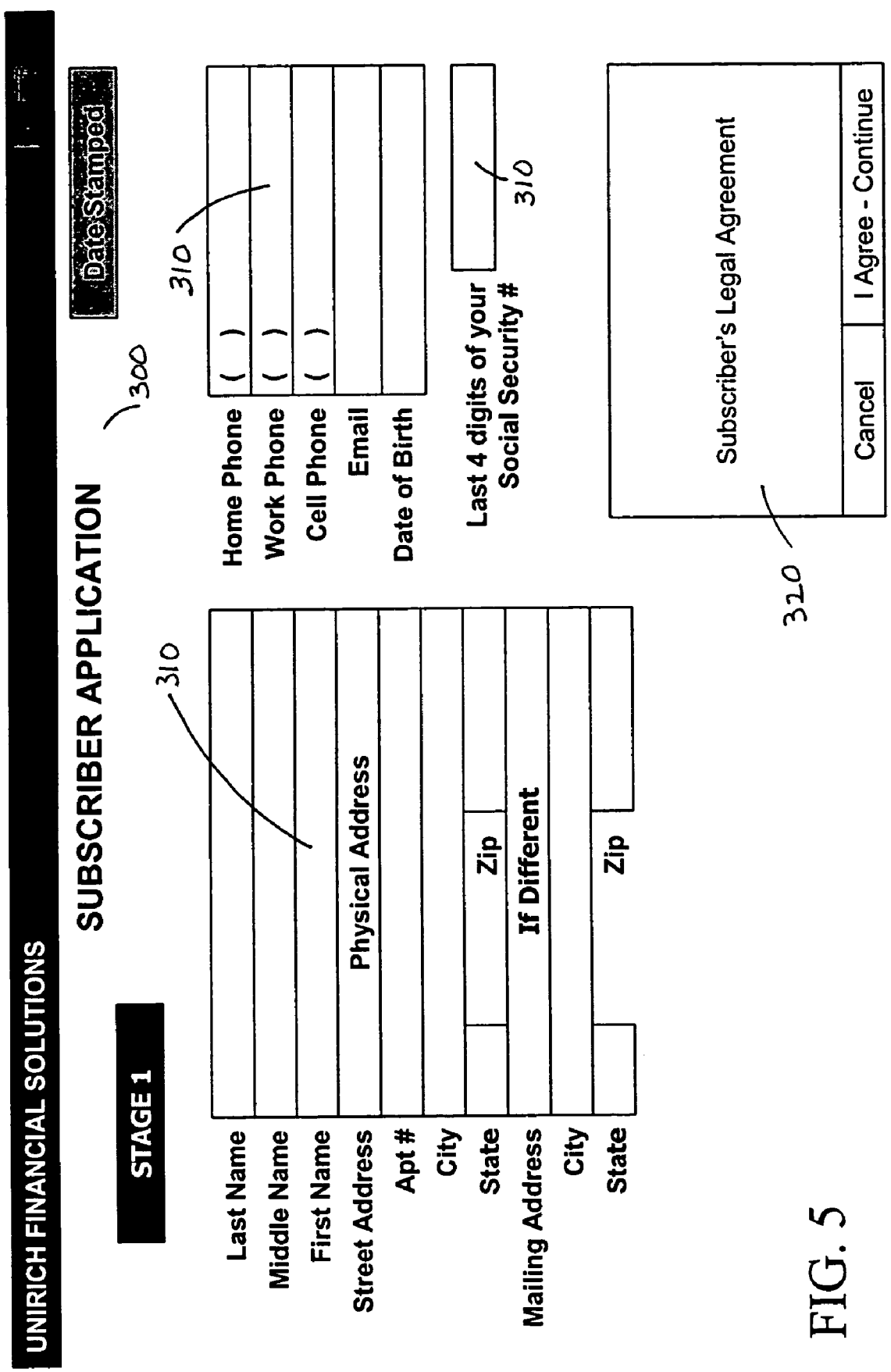

Referring now to FIG. 5, herein is illustrated a user interface/subscriber application 300 according to the present invention. The interface 300 includes a subscriber identification window 310 and legal agreement window 320. Subscriber identification window 310 includes areas in which to indicate a subscriber's name, address, phone, e-mail, date of birth, and the last four digits of his or her Social Security number. The computer monitor also displays a conventional, movable screen cursor (not shown), the position of which is manually controlled by the user through movement of the computer mouse, entry by key pad, or other similar device, and the operation of which is controlled by the computer operating system.

As shown in FIG. 6, financial data for a subscriber may be entered on the second screen, "Financial Data" 330. The financial data interface 330 includes subscriber's name window 340, current base net pay window 350, pay date window 360, indicators for pay method and frequency 370, and deposit information window 380. As may be seen, deposit information 380 provides for identification of up to three financial institution accounts. However, the direct deposit received from subscriber 110's company 140 must be deposited into the account listed as a primary account in order for service provider 120 to properly debit the amount owed.

Figure 9:
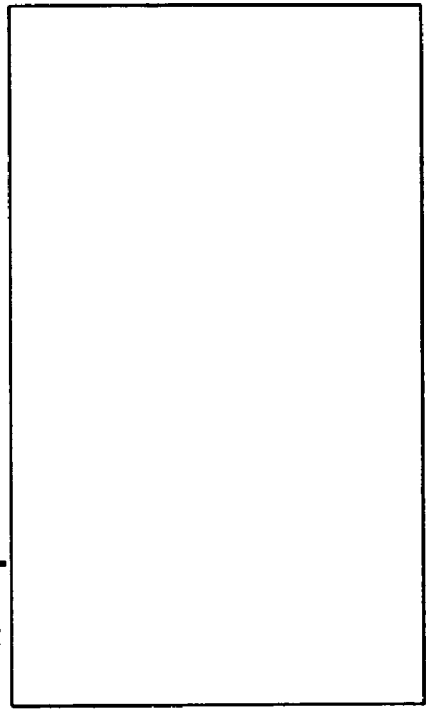

Referring now to FIG. 7, the subscriber application form includes bubbles 390 to indicate whether the subscriber 110's income comes from U.S. military, social security, or full time employment sources. FIG. 8 illustrates the subscriber application user interface 300 requesting U.S. military information 400 regarding subscriber 110. This page is to be verified by a military payroll department. If not verified, as seen on FIG. 9, a reason must be provided. Otherwise, as seen in FIG. 10, a message indicating a negative verification status is received.

FIG. 11 illustrates a positive verification status response, indicating that a subscriber 110 has been approved and that a first weekly deposit will be made on a certain date, and that deposits will be in a certain amount specified. This window advises subscriber 110 that it is his or her responsibility to inform service provider 120 of any changes to name, address, phone number, employment or benefit status, base net pay amount, financial institution name, and/or account numbers.

Figure 12:
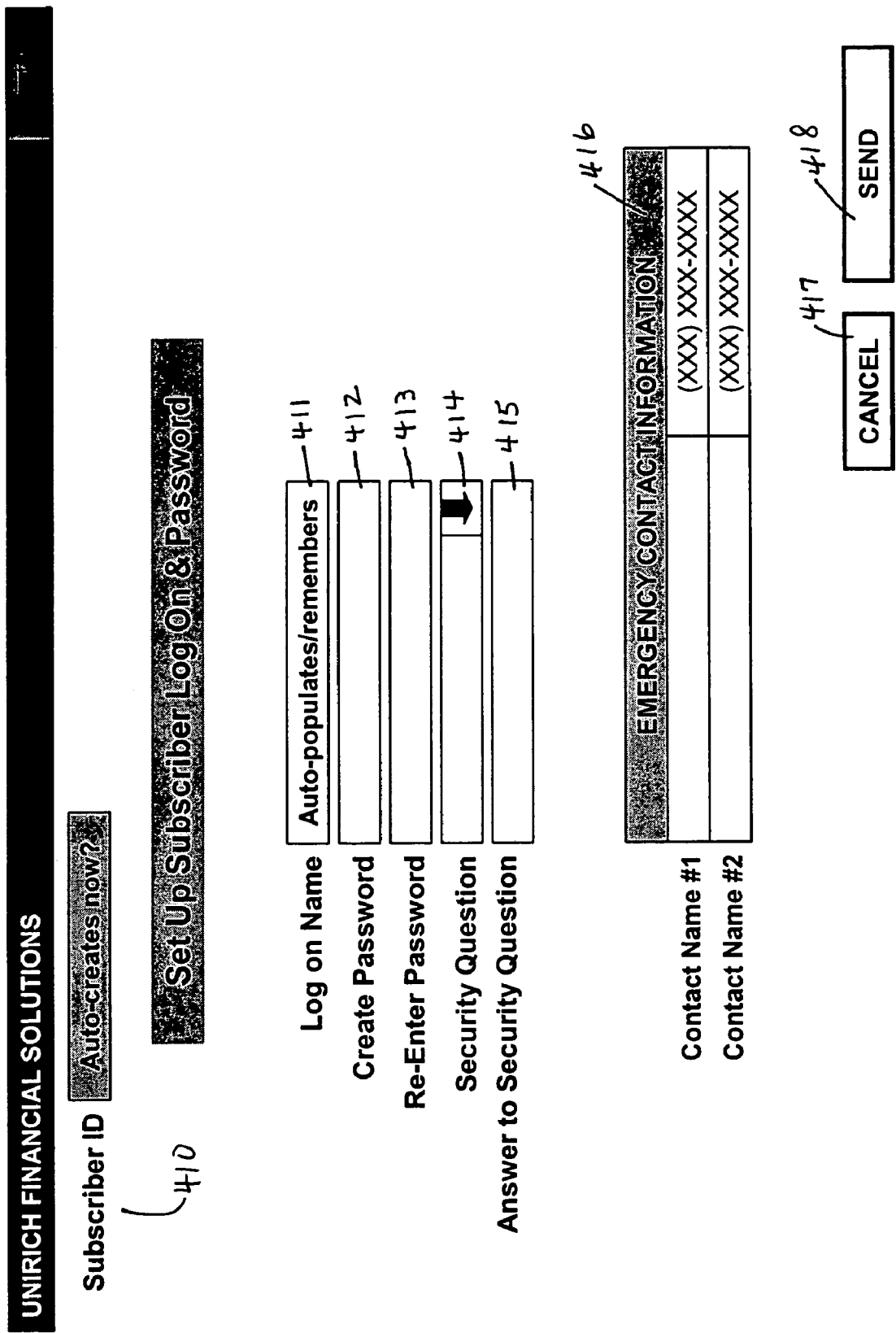

Referring now to FIG. 12, the "Subscriber ID" window 410 is illustrated. The subscriber ID window 410 includes a log on name window 411, a create password window 412, and reenter password window 413, a security question window 414, an answer to security question window 415, emergency contact window 416, and cancel button 417 and send button 418. Once the required information has been supplied in the related windows, the user then initiates an entry signal by conventionally clicking upon the computer mouse left click key.

Figure 15:

With reference to FIG. 13 there is shown an "Inactivation Screen" 420 to permit a subscriber 110 to inactive his or her account. The appropriate information is supplied in the appropriate windows and the cancel or send button is employed. As seen in FIG. 14, subscriber 110 is then asked whether he or she is sure that terminating the account is desired. As seen in FIG. 15, the inactivate subscription window 421 confirms that membership was successfully cancelled, and the date of last deposit is confirmed.

With reference now to FIG. 16, the "Reactivate Subscriber" screen 430 permits a subscriber 110 to reactivate his or her account. A reactivation fee is noted on screen 430, and identifying information is requested. As seen on FIG. 17, the subscriber reactivation screen 440 provides for an update on personal information, including name, address, phone. FIG. 18 shows the subscriber reactivation screen 441 requesting updated information for base net pay, pay dates, pay methods, pay frequency, and deposit information.

With reference next to FIG. 19, there is shown a company application 500 requesting various information about subscriber 110's company 140. There are windows for industry, title, company name and address, company phone and e-mail, and for the creation of a user name, password, and security question. The legal agreement with the company 140 appears in window 321.

FIG. 20 shows "Subscriber Enrollment" screen 510, with windows for company, employee, and subscriber identification numbers; subscriber name, address, phone, birth date, and hire date; and for determination of pay frequency and status.

FIG. 21 shows "Subscriber Data" screen 520, which provides for windows to enter various pay information, including pay method, pay frequency, pay period dates, current base net pay, and service charge. Moreover, financial institution window 385 is provided for the entry of information regarding routing numbers, account type, account number, percent of the base net pay, the amount of the weekly deposit, the year-to-date service charge, and the year-to-date deposits. FIG. 22 shows the "Edit Subscriber Financial Data" screen 521, wherein notifications of financial data may be entered. FIG. 23 shows the "Inactivation/Termination" screen 530, wherein subscriber 110 may inactivate or terminate his account; similarly, FIG. 24 shows "Reactivation Screen" 540, wherein identification information may be entered and a reactivation date selected.

It should be understood that the present invention may be used in connection with a global computer network system interconnecting multiple remote users, each having a computer or workstation or with a central computer system having multiple video workstation monitors.

It thus is seen that a new method of payment of salary and system for automating the salary payment process is now provided that has distinct advantages over the prior art. While the invention has been described in detail with particular reference to the preferred embodiments thereof, it should be understood that many modification, additions, and deletions, may be made thereto without departure from the spirit and scope of the invention as set forth in the following claims.

The invention claimed is:

1. A method for an automated payment process for providing potential subscribers with funds based on their income at regular, pre-defined intervals, which they are normally paid, comprising the steps of:

(A) Subscribing an individual, including authorizing financial institution transfers, by contacting a service provider, completing authorization forms and returning said forms to the service provider, entering the completed forms into the service provider's database, and returning the forms to the potential subscribers for verification of status and income;

(B) Verifying subscription;

(C) Authorizing electronic funds transfer with direct deposit data to the service provider's financial institution;
(D) The service provider's financial institution electronically transferring funds into a customer account for the potential subscribers, electronically forwarding the remainder of subscribers' deposit to the Federal Reserve;
(E) The Federal Reserve electronically distributing the rest of the deposit to subscriber's own financial institution account, where subscribers may optionally access their funds at their respective financial institutions;
(F) The service provider optionally periodically confirming wage verification data;
(G) The service provider sending a transaction report for each transfer; and
(H) The service provider deducting a service charge from the subscriber's account on designated dates.

2. A method for an automated payment process for providing subscribers with funds based on their income at regular, pre-defined intervals, comprising the steps of:
(A) Enrolling a subscriber, including executing direct deposit forms and agreements setting forth an amount to be paid to subscriber;
(B) Sending direct deposit pre-notes to test accuracy;
(C) Electronically depositing designated pay amount into subscriber's financial institution account, less service charge;
(D) Direct depositing subscriber's pay into service provider's financial institution account;
(E) Deducting amount of prepayment and service charge from subscriber's pay; and
(F) Electronically transferring a balance of pay into subscriber's financial institution account via the Federal Reserve Bank, all deposits being reported by each financial institution or bank to its respective customers in a transaction report, and subscribers optionally accessing their funds at their respective financial institutions.

3. The method of claim, wherein subscriber's pay is deposited into service provider's financial institution account.

4. The method of claim, wherein the subscriber's pay is direct deposited into a subscriber's financial institution account.

5. A method for an automated payment process for providing subscribers with funds based on their income at regular, pre-defined intervals, comprising the steps of:
(A) Starting a registration period for a company's employees by execution of an agreement between a service provider and the company, which then registers on the service provider's website;
(B) Service provider giving company access to a computer network and testing its systems once company has completed a registration process;
(C) Company informing its employees of availability of interim pay service and putting interested employees on direct deposit;
(D) Subscribing an individual employee by employee authorizing company to send appropriate funds to the service provider; company informing the service provider of any new subscribers; company, employee/subscriber, and service provider agreeing upon an amount and frequency that subscriber is to be paid; completing authorization forms and returning said forms to the service provider; entering the completed forms into the service provider's database; returning the forms to the potential subscriber for verification of status and income; and company or subscribers themselves registering subscribers;
(E) Verifying subscription;
(F) Exporting employee wage information from company's accounting software to service provider's software and storing appropriate information in a secure relational database;
(G) In first and third alternating weeks, company notifying service provider of subscribers' earned but unpaid wage data for the respective week, and service provider notifying company of deposits made to service provider's financial institution;
(H) Service provider's financial institution depositing funds into the accounts of subscribers who are also its banking customers, and forwarding the rest of the funds to the Federal Reserve Bank;
(I) Federal Reserve Bank distributing the rest of the deposits to subscribers' bank accounts, all deposits being reported by each financial institution or bank to its respective customers in a transaction report, and subscribers optionally accessing their funds at their respective financial institutions;
(J) Service provider reconciling the transaction report from its financial institution and forwarding a copy to company;
(K) In second and fourth alternating weeks, company exporting wage verification data to service provider and transferring two weeks of subscriber's base net pay to service provider's bank account, repaying service provider for funds issued to date plus service charges and enabling service provider to pay subscriber's current week's pay;
(L) Service provider initiating direct deposits from its own financial institution into the accounts of all subscribers who are due to receive intermediate funds that week; and
(M) The service provider deducting a service charge from the subscriber's account on designated dates.

6. A method for an automated payment process for providing subscribers with funds based on their income at regular, pre-defined intervals, comprising the steps of:
(A) Starting a registration period for a company's employees by optional endorsement of the service provider by the company, with individual employees subscribing with the service provider;
(B) Subscribing an individual employee by employee contracting with service provider and authorizing company to send appropriate funds to service provider's financial institution and authorizing service provider's financial institution to send appropriate funds to the subscriber's account at subscriber's financial institution, and entering completed forms into the service provider's database;
(C) Verifying subscription and testing the accuracy of direct deposits;
(D) Service provider depositing designated pay into subscriber's account on designated days,
(E) Company paying its subscribing employees' pay, on scheduled company paydays, into service provider's account at its financial institution;
(F) Service provider deducting amounts that it is owed for service charges and previous payments, and direct depositing the balance into subscriber's account at its financial institution via the Federal Reserve Bank, all deposits being reported by each financial institution or bank to its respective customers in a transaction report, and subscribers optionally accessing their funds at their respective financial institutions.

7. A method for an automated payment process for providing subscribers with funds based on their income at regular, pre-defined intervals, comprising the steps of:

(A) Starting a registration period for a company's employees by optional endorsement of service provider by the company, with individual employees subscribing with service provider;

(B) Subscribing an individual employee by employee contracting with service provider and authorizing company to send appropriate funds to the service provider's financial institution, authorizing the service provider's financial institution to send funds to the subscriber's account at subscriber's financial institution, and authorizing the transfer from subscriber's account at its own financial institution to service provider in an amount equal to previous payments made by service provider to subscriber, plus service charges, and entering the relevant authorization data into the service provider's database;

(C) Verifying subscription and testing the accuracy of direct deposits;

(D) Service provider depositing designated pay into subscriber's account on designated days, all deposits being reported by each financial institution or bank to its respective customers in a transaction report, and subscribers optionally accessing their funds at their financial institutions;

(E) Company paying its subscribing employees' pay, on scheduled company paydays, into subscribing employee's account at its financial institution in accordance with company's wage verification data, all deposits being reported by each financial institution or bank to its respective customers in a transaction report, and subscribers optionally accessing their funds at their respective financial institutions; and (F) Transferring funds from subscriber's account at its financial institution to service provider to reimburse for service charges and previous payments.

\* \* \* \* \*